United States Patent [19]

van der Linde

[11] Patent Number: 4,694,033

[45] Date of Patent: Sep. 15, 1987

[54] RESIN COMPOSITION AND PROCESS FOR THE PREPARATION OF THIS RESIN COMPOSITION

[75] Inventor: Robert van der Linde, Zwolle, Netherlands

[73] Assignee: DSM Resins B.V., Zwolle, Netherlands

[21] Appl. No.: 826,976

[22] Filed: Feb. 7, 1986

Related U.S. Application Data

[63] Continuation-in-part of Ser. No. 762,325, Aug. 5, 1985.

[30] Foreign Application Priority Data

| Aug. 9, 1984 [NL] | Netherlands | 8402455 |
| Dec. 7, 1985 [NL] | Netherlands | 8503379 |
| Feb. 4, 1986 [NL] | Netherlands | 8600266 |

[51] Int. Cl.$^4$ .............. C08G 63/54; C08G 63/48; C08G 59/00; C08G 63/00

[52] U.S. Cl. .............. 523/437; 523/438; 524/906; 524/914; 527/601; 527/604; 528/295.3; 528/295.5

[58] Field of Search .............. 527/601, 604; 524/906, 524/914; 528/295.3, 295.5, 297; 523/437, 438

[56] References Cited

U.S. PATENT DOCUMENTS

| 2,889,293 | 6/1959 | Hensley et al. | 527/604 |
| 2,909,496 | 10/1959 | Cooke et al. | 525/438 |
| 2,980,638 | 4/1961 | Polovina | 527/604 |
| 3,308,077 | 3/1967 | Pattison et al. | 524/576 |
| 3,979,477 | 9/1976 | Schmid et al. | 528/297 |
| 4,113,702 | 9/1978 | Psencik | 528/297 |
| 4,340,698 | 7/1982 | De Jongh et al. | 525/438 |
| 4,474,940 | 10/1984 | Wilk et al. | 528/297 |
| 4,474,941 | 10/1984 | Wilk et al. | 528/297 |

*Primary Examiner*—Ronald W. Griffin
*Attorney, Agent, or Firm*—Cushman, Darby & Cushman

[57] ABSTRACT

The present invention relates to resin compositions comprising a mixture of at least two resins, one resin consisting of the reaction product of an epoxidized fatty acid ester of a polyvalent alcohol with a carboxylic acid, and another resin consisting of a carboxylic acid-modified ester of a polyvalent alcohol.

23 Claims, No Drawings

RESIN COMPOSITION AND PROCESS FOR THE PREPARATION OF THIS RESIN COMPOSITION

RELATED APPLICATIONS

This application is a continuation-in-part of my copending application, Ser. No. 762,325, filed Aug. 5, 1985, the disclosure of which is incorporated herein by reference.

FIELD OF THE INVENTION

The present invention relates to a resin composition comprising a mixture of at least two resins, one resin consisting of the reaction product of an epoxidized fatty acid ester of a polyvalent alcohol with a carboxylic acid, and another resin consisting of a carboxylic acid-modified ester of a polyvalent alcohol. The invention also provides the preparation of such a resin composition.

BACKGROUND OF THE INVENTION

Many processes employed in the prior art for the preparation of a resin composition for linoleum manufacture (the resin composition hereinafter will be referred to as linoleum cement; in the linoleum preparation it is also called Bedford cement, after the manner in which it is formed), make use of one or more polyunsaturated oils, which are 'dried' by air oxidation. Drying oils are understood to means esters of natural fatty acids with polyvalent alcohols, in particular, glycerol or pentaerithrytol. During or after drying, these drying oils are mixed with a resin, in particular with rosin, which yields the Bedford cement. After mixing this cement with fillers and pigments, the linoleum mix obtained is applied to a mostly jute substrate, usually by means of a calendar. The product thus formed is then cured at a temperature between 60° C. and 80° C. for a number of weeks (see, e.g., Ullmann, Encyklopädie der technischen Chemie, band 12 (1976), p. 24 ff., and Encycl. of Pol. Sci. and Techn., Vol. 1 (1964), p. 403 ff.).

The disadvantage of these processes for the preparation of linoleum is the length of time required for curing the product, which is also dependent on the thickness of the linoleum layer. Furthermore, intensive, manual inspection is required to determine whether the desired durability has been reached.

Our said U.S. patent application Ser. No. 762,325 describes a resin composition which is suitable as linoleum cement; the duration of the necessary curing of the linoleum is substantially reduced and the homogeneity of the material obtained is improved.

That resin composition comprises a mixture of two resins. The first resin consists of the reaction product of an epoxidized fatty acid ester of a polyvalent alcohol with a monocarboxylic acid, while the second resin consists of a carboxylic acid-modified ester of a polyvalent alcohol. The term 'carboxylic acid-modified' in this context also covers the presence of carboxylic anhydride groups as well as carboxylic acid groups.

However, such a resin composition still has the disadvantage that its viscosity is such as to render it difficult to process the resin composition using the existing production equipment in the linoleum industry.

OBJECTS AND SUMMARY OF THE INVENTION

The object of the present invention is to provide an improved resin composition which can conveniently be processed using the existing equipment in the linoleum industry, the resin composition of which comprises a mixture of at least two resins, wherein the first resin consists of a carboxylic acid-modified ester of a polyvalent alcohol.

The process according to this invention is characterized in that the resins are mixed for such a period of time and at such a temperature that a partial pre-reaction takes place.

This partly pre-reacted condition is referred to as the "B-stage". The dynamic viscosity ($\eta d$) may be between $10^2$ and $10^5$ PaSec (Pascals times seconds) giving the resin composition the consistency needed to yield an excellent product upon further processing to linoleum.

DETAILED DESCRIPTION OF THE INVENTION

The present invention provides a resin composition comprising a pre-reacted mixture of at least two resins, wherein the first resin consists of the reaction product of an epoxidized fatty acid ester of a polyvalent alcohol with a carboxylic acid and the second resin consists of an aliphatic carboxylic acid-modified ester of an aliphatic polyvalent alcohol, and further wherein the first and second resins have been mixed for a sufficient time and at a temperature such that a partial prereaction therebetween takes place.

The present invention also provides a process for preparing a resin composition comprising forming a mixture of at least two resins, the first resin consisting of the reaction product of an epoxidized fatty acid ester of a polyhydroxy alcohol with a carboxylic acid, and the second resin consisting of a corboxylic acid-modified ester of a polyhydroxy alcohol, and mixing such resins for a sufficient time and at a sufficient temperature such that a partial pre-reaction therebetween takes place.

The present invention also provides surface coverings, such as a linoleum sheet, including a resin composition comprising a pre-reacted mixture of at least two resins wherein the first resin consists of the reaction product of an epoxidized fatty acid ester of a polyvalent alcohol with an aliphatic carboxylic acid and the second resin consists of a carboxylic acid-modified ester of an aliphatic polyvalent alcohol, and further wherein the first and second resins have been mixed for a sufficient time period ranging from five minutes to four hours at a temperature between 60° C. and 250° C.

According to the preferred embodiment of the invention, the resins are partially pre-reacted for a time period ranging from 5 minutes to 4 hours at a temperature between 60° C. and 250° C. According to a further preferred embodiment of the invention, the resins are partially pre-reacted for a time period ranging from 0.5 hours to 2.5 hours at a temperature between 120° C. and 180° C.

According to the present invention at least two resins are employed in the resin composition. In the first step, modified drying oils are mixed in the resin.

The drying oil in the first resin is employed in epoxidized form; use is particularly of an epoxide of soy-bean oil, linseed oil, sunflower oil and/or a tall oil fatty acid ester. The polyvalent alcohol used for esterification is preferably chosen from glycerol, pentaerithrytol, trimethylolpropane and/or polyalkene glycol. Mixtures of these or other polyvalent alcohols may also be applied.

In the first resin, the carboxylic acid is chosen from monocarboxylic acids such as benzoic acid, para-tertiary-butylbenzoic acid, tall oil fatty acid, stearic acid, di- or poly-carboxylic acids, rosin, acid hydrocarbon resins, and/or mixtures thereof. In linoleum preparation, preference is particularly given to the use of rosin as the acid, so as to retain the properties characteristic of linoleum, which originate from the rosin. Suitable polycarboxylic acids are those having from 4 to 54 C atoms. In particular, di- or trimer fatty acids or mixtures thereof, may be employed as such acids.

The carboxylic acid-modified ester in the second resin may consist of the reaction product of an unsaturated fatty acid ester of a polyvalent alcohol with one or more ethylenically unsaturated mono- or poly-carboxylic acids or the anhydrides thereof. An unsaturated fatty acid ester, a vegetable oil or a tall oil fatty acid ester may be chosen as initial reactants. Esterification takes place in particular with a polyvalent alcohol taken from the group formed by glycerol, pentaerithrytol, trimethylolpropane and/or polyalkene glycol, while mixtures of these or other polyvalent alcohols may also be used. As the vegetable oil to be used, in the context of the invention, particularly suitable are soy-bean oil, linseed oil, sunflower oil, olive oil, safflower oil and/or rape seed oil.

The ethylenically unsaturated mono- or poly-carboxylic acid or the anhydride thereof, which is used in the preparation of the second resin, may contain one or more ethylenically unsaturated groups in the molecule. Acrylic acid, methacrylic acid, sorbic acid and/or crotonic acid are suitable monocarboxylic acids for this second resin. Maleic acid and/or fumaric acid and/or the anhydrides thereof are preferred suitable polycarboxylic acids. Maleic anhydride is particularly suitable for this purpose; the so-called maleinized oils are easily prepared and are commercially available.

The carboxylic acid-modified ester in the second resin may also consist of the reaction product of a hydroxy-functional fatty acid ester of a polyvalent aliphatic alcohol and a polycarboxylic acid. The hydroxy-functional fatty acid ester is derived from castor oil, hydroxystearic acid and/or hydroxypalmitic acid. The polyvalent alcohol used for esterification is preferably chosen from the group formed by glycerol, pentaerithrytol, trimethylolpropane and/or polyalkene glycol. Mixtures of these or other polyvalent alcohols may also be used. The polyvalent carboxylic acid that is reacted with said hydroxy-functional fatty acid ester may preferably be taken from the group formed by phthalic acid, tetra- or hexa-hydrophthalic acid and trimellitic acid.

In addition to the description of the second resin as presented above, said resin may also consist of one or more acid-functional alkyd resins and/or acid-functional hydrocarbon resins and/or mixtures thereof.

In the preparation process, the first resin may be prepared by reaction of the epoxidized ester with the carboxylic acid. This preparation takes place at a temperature range of 100° C. to 250° C., and preferably of 150° C. to 200° C., optionally in the presence of a catalyst. As catalyst, use is preferably made of the customary catalysts for the acid-epoxy reaction, such as triethylamine.

When the first resin is being combined with the second resin, a catalyst of the same type as that used in the preparation of the first resin may be added.

The resin composition according to this invention may also be employed in combination with resin compositions on the basis of one or more polyunsaturated oils that are 'dried' by air oxidation.

While the preceding discussion has primarily described the application of the resin composition of this invention to linoleum preparation, such resin composition is not limited thereto. Other systems using resin compositions, customarily in the form of so-called two-component resins, with the object of obtaining a surface covering layer, are also suitable for the application of this resin composition. Such uses include roof coverings and the so-called underbody coatings in the automotive industry.

This invention will now be elucidated with reference to the following non-restrictive examples.

EXAMPLES

Preparation of the first resin

A 3-liter reaction vessel, provided with a mechanical stirrer, thermometer and vertical cooler, is charged with 60 parts by weight of epoxidized linseed oil (Edenol B 316 of Henkel, oxirane content higher than 8.5%), 40 parts by weight of rosin and 1 part by weight of triisobutylamine. While nitrogen is being passed over the vessel, the reaction mixture is heated to 180° C. The contents of the reaction vessel are kept at this temperature until the acid number has decreased to 3 mg KOH/g. The product is subsequently cooled. The epoxy equivalent weight is 600.

Preparation of the second resin

With equipment similar to that used for the first resin, 878 parts of weight of linseed oil are heated to 200° C. under nitrogen. Subsequently, 294 parts by weight of maleic anhydride are cautiously added, divided into portions over 2 hours. Care is taken that the temperature does not exceed 200° C. After the entire amount of maleic acid has been added, the temperature is gradually raised to 225° C. and maintained thereof for 4 hours.

Preparation of the B stage

The first resin and the second resin are mixed in a weight ratio of 1:1 at 100° C., and subsequently heated to 125° C. The resins are kept at this temperature for two hours, after which the composition is cooled. Immediately upon cooling, the resin composition is ready to be processed into linoleum in the customary manner.

Determination of viscosity

Using a parallel plate viscometer (Rheometrics RMS 605 mechanical spectrometer), the dynamic viscosity ($\eta$d) of the resin composition is determined as a function of frequency at 100° C. This viscosity (at 1 Hz) is measured to be $6 \times 10^3$ PaSec.

Determination of the curing rate of the final product of linoleum

Test sheets are prepared with a Schwabenthan twin roller mill (diameter 80 mm, speed 27/35 rpm) using the B-stage product described above with conventional linoleum additives and fillers. Plates ($250 \times 250 \times 4$ mm) are molded from these test sheets at a temperature of 100° C. for a time period of 4 minutes. From these plates test bars are punched. After curing, the E-modulus, tensile strength and elongation at break are determined.

The test bars are cured at a temperature of 80° C. for a time period of 1, 5, 11 or 50 days.

| | E-modulus (N/mm$^2$) | Tensil strength (N/mm$^2$) | Elongation (%) |
|---|---|---|---|
| 2 days in refrigerator | 23 ± 1 | 1.6 ± 0.1 | 6.7 ± 0.4 |
| 1 day | 105 ± 4 | 7.8 ± 0.8 | 4.9 ± 0.7 |
| 5 days | 150 ± 5 | 12.6 ± 0.7 | 5.8 ± 0.1 |
| 11 days | 307 ± 3 | 11.7 ± 0.1 | 4.7 ± 0.3 |
| 50 days | 450 ± 0.1 | 15.4 ± 0.3 | 4.1 ± 0.1 |

The data show that the present resin composition results in fast curing and in a product having excellent properties.

I claim:

1. A resin composition comprising a pre-reacted mixture of at least two resins, wherein the first resin consists of the reaction product of an epoxidized fatty acid ester of a polyvalent alcohol with a carboxylic acid and the second resin consists of an aliphatic carboxylic acid-modified ester of an aliphatic polyvalent alcohol, and wherein said first and second resins have been mixed for a sufficient time and at a temperature such that a partial pre-reaction therebetween takes place.

2. A resin composition according to claim 1, wherein the said first and second resins have been partially pre-reacted for a time period ranging from 5 minutes to 4 hours at a temperature between 60° C. and 250° C.

3. A resin composition according to claim 2, wherein said time period ranges from 0.5 hours to 2.5 hours and said temperature is between 120° C. and 180° C.

4. A resin composition according to claim 2, wherein said epoxidized fatty acid ester is an epoxide of soy-bean oil, linseed oil, sunflower oil and/or a tall oil fatty acid ester.

5. A resin composition according to claim 2, wherein said polyvalent alcohol in the first resin is glycerol, pentaerithrytol, trimethylolpropane and/or polyalkene glycol.

6. A resin composition according to claim 2, wherein said carboxylic acid in said first resin is benzoic acid, para-tertiary-butylbenzoic acid, tall oil fatty acid, stearic acid, di- or polycarboxylic acid, rosin, acid hydrocarbon resin and/or a mixture thereof.

7. A resin composition according to claim 6, wherein said carboxylic acid is rosin.

8. A resin composition according to claim 2, wherein said second resin consists essentially of the reaction product of an unsaturated fatty acid ester of an aliphatic polyvalent alcohol with one or more ethylenically unsaturated mono- or poly-carboxylic acids or anhydrides thereof.

9. A resin composition according to claim 8, wherein said unsaturated fatty acid ester is a vegetable oil and/or a tall oil fatty acid ester.

10. A resin composition according to claim 9, wherein said unsaturated fatty acid ester is soybean oil, linseed oil, sunflower oil, olive oil, safflower oil and/or rape seed oil.

11. A resin composition according to claim 8, wherein said polyvalent alcohol is glycerol, pentaerithrytol, trimethylolpropane and/or polyalkene glycol.

12. A resin composition according to claim 8, wherein said unsaturated monocarboxylic acid is acrylic acid, methacrylic acid, sorbic acid and/or crotonic acid.

13. A resin composition according to claim 8, wherein said unsaturated polycarboxylic acid or anhydride is fumaric acid and/or maleic acid and/or the anhydride thereof.

14. A resin composition according to claim 2, wherein said second resin consists of the reaction product of a hydroxy-functional fatty acid ester of a polyvalent alcohol with a polycarboxylic acid or anhydride.

15. A resin composition according to claim 14, wherein said hydroxy-functional fatty acid ester is derived from castor oil, and an ester of hydroxystearic acid and/or hydroxypalmitic acid and a polyvalent alcohol.

16. A resin composition according to claim 14, wherein said polyhydroxy alcohol is glycerol, pentaerithrytol, trimethylolpropane and/or polyalkene glycol.

17. A resin composition according to claim 14, wherein said polycarboxylic acid or anhydride thereof in said first resin is phthalic acid, tetra- or hexahydrophthalic acid and/or trimellitic acid and/or the respective anhydride.

18. A resin composition according to claim 2, wherein said second resin contains one or more acid-functional alkyd resins and/or acid-functional hydrocarbon resins and/or mixtures thereof.

19. A resin composition according to claim 2, which is adapted for processing to linoleum.

20. A process for the preparation of a resin composition, comprising forming a mixture of at least two resins, the first resin consisting of the reaction product of an epoxidized fatty acid ester of a polyhydroxy alcohol with a carboxylic acid, and the second resin consisting of a carboxylic acid-modified ester of a polyhydroxy alcohol, and mixing said resins for a sufficient time and at a temperature such that a partial prereaction takes place.

21. A process for the preparation of a resin composition, according to claim 20, wherein said resins are partially pre-reacted for a time period ranging from 5 minutes to 4 hours at temperature between 60° C. and 250° C.

22. A process for the preparation of resins according to claim 21, wherein said time period ranges from 0.5 hours to 2.5 hours and said temperature is between 120° C. and 180° C.

23. A linoleum sheet, including a resin composition comprising a pre-reacted mixture of at least two resins, wherein the first resin consists of the reaction product of an epoxidized fatty acid ester of a polyvalent alcohol with an aliphatic carboxylic acid and the second resin consists of a carboxylic acid-modified ester of an aliphatic polyvalent alcohol, and wherein said first and second resins have been mixed for a time period ranging from 5 minutes to 4 hours at a temperature between 60° C. and 250° C.

* * * * *